United States Patent
Ren et al.

(10) Patent No.: US 8,803,950 B2
(45) Date of Patent: Aug. 12, 2014

(54) THREE-DIMENSIONAL FACE CAPTURING APPARATUS AND METHOD AND COMPUTER-READABLE MEDIUM THEREOF

(75) Inventors: Haibing Ren, Beijing (CN); Xiangsheng Huang, Beijing (CN); Hwa Sup Lim, Hwaseong-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 667 days.

(21) Appl. No.: 12/862,293

(22) Filed: Aug. 24, 2010

(65) Prior Publication Data
US 2011/0043610 A1  Feb. 24, 2011

(30) Foreign Application Priority Data

Aug. 24, 2009 (CN) .......................... 2009 1 0168295
May 6, 2010 (KR) ........................ 10-2010-0042349

(51) Int. Cl.
*G06T 15/00* (2011.01)
*G06T 17/00* (2006.01)
*H04N 5/232* (2006.01)

(52) U.S. Cl.
CPC ............ *H04N 5/23219* (2013.01); *G06T 17/00* (2013.01); *G06T 15/00* (2013.01)
USPC ............. 348/46; 345/419; 345/420; 382/154; 382/118

(58) Field of Classification Search
CPC ................. H04N 5/23219; G06T 2207/30201; G06T 17/00; G06T 17/20; G06T 15/08
USPC ........ 348/42–50; 382/154, 118; 345/419, 420
See application file for complete search history.

(56) References Cited

U.S. PATENT DOCUMENTS

| | | | | |
|---|---|---|---|---|
| 6,047,078 A * | 4/2000 | Kang | ............................ | 382/107 |
| 6,529,626 B1 * | 3/2003 | Watanabe et al. | ............. | 382/154 |
| 6,556,196 B1 * | 4/2003 | Blanz et al. | ................... | 345/419 |
| 6,954,202 B2 * | 10/2005 | Han et al. | ...................... | 345/419 |
| 6,987,511 B2 * | 1/2006 | Taubin | ......................... | 345/420 |
| 7,148,889 B1 * | 12/2006 | Ostermann | ................... | 345/419 |
| 7,433,807 B2 * | 10/2008 | Marschner et al. | .............. | 703/2 |
| 7,436,988 B2 * | 10/2008 | Zhang et al. | .................. | 382/118 |
| 7,492,927 B2 * | 2/2009 | Marschner et al. | ........... | 382/118 |

(Continued)

OTHER PUBLICATIONS

Blanz et al. "Face Recognition based on Fitting a 3D Morphable Model". (Sep. 2003) IEEE Trans. on Pat. Analysis and Machine Intel. vol. 25, No. 9: p. 1063-1074.*

(Continued)

*Primary Examiner* — Sath V Perungavoor
*Assistant Examiner* — Matthew J Anderson
(74) *Attorney, Agent, or Firm* — Staas & Halsey LLP (57) ABSTRACT

Disclosed is a 3D face capturing apparatus, method and computer-readable medium. As an example, the 3D face capturing method includes obtaining a face color image, obtaining a face depth image, aligning, by a computer, the face color image and the face depth image, obtaining, by the computer, a 3D face model by 2D modeling of the face color image and covering a modeled 2D face area on an image output by an image alignment module, removing by the computer, depth noise of the 3D face model, and obtaining, by the computer, an accurate 3D face model by aligning the 3D face model and a 3D face template, and removing residual noise based on a registration between the 3D face model and the 3D face template.

20 Claims, 7 Drawing Sheets

(56) References Cited

U.S. PATENT DOCUMENTS

| | | | |
|---|---|---|---|
| 7,564,994 B1* | 7/2009 | Steinberg et al. | 382/118 |
| 7,671,870 B2* | 3/2010 | Cook et al. | 345/582 |
| 7,756,325 B2* | 7/2010 | Vetter et al. | 382/154 |
| 7,835,568 B2* | 11/2010 | Park et al. | 382/154 |
| 7,856,125 B2* | 12/2010 | Medioni et al. | 382/118 |
| 7,894,636 B2* | 2/2011 | Kozakaya | 382/118 |
| 7,925,060 B2* | 4/2011 | Norita et al. | 382/118 |
| 8,125,813 B2* | 2/2012 | Nizin et al. | 365/65 |
| 8,624,964 B2* | 1/2014 | Barenbrug | 348/54 |
| 2003/0169906 A1* | 9/2003 | Gokturk et al. | 382/115 |
| 2005/0073702 A1* | 4/2005 | Shaked et al. | 358/1.9 |
| 2007/0104360 A1* | 5/2007 | Huang et al. | 382/154 |
| 2009/0153552 A1* | 6/2009 | Fidaleo et al. | 345/419 |
| 2009/0215533 A1* | 8/2009 | Zalewski et al. | 463/32 |
| 2010/0157040 A1* | 6/2010 | Ofir | 348/77 |

OTHER PUBLICATIONS

Roy et al. "Denoising 3D Models with Attributes using Soft Thresholding". (2004) Proc. of SPIE vol. 5607, p. 139-147.*

* cited by examiner

THREE-DIMENSIONAL FACE CAPTURING APPARATUS AND METHOD AND COMPUTER-READABLE MEDIUM THEREOF

CROSS-REFERENCE TO RELATED APPLICATIONS

This application claims the benefit of Korean Patent Application No. 10-2010-0042349, filed on May 6, 2010, in the Korean Intellectual Property Office, and Chinese Patent Application No. 200910168295.2, filed on Aug. 24, 2009, in the Korean Intellectual Property Office, the disclosure of which is incorporated herein by reference.

BACKGROUND

1. Field

Example embodiments relate to a three-dimensional (3D) face capturing apparatus, method and computer-readable medium.

2. Description of the Related Art

Today's users are not satisfied with two-dimensional (2D) information. Users demand new experiences associated with a human interface, a natural game control, a 3D display, and the like. Accordingly, superior 3D contents and 3D facial information may be demanded.

A laser scanner may be a general and convenient apparatus for capturing a 3D target object. A 3D surface may be accurately obtained using the laser. Some researchers have also attempted to capture the 3D face using a single camera or a plurality of cameras.

U.S. Pat. No. 6,556,196, titled 'Method and Apparatus for the Processing of Images', discusses a 3D face being formed from a 2D image. The patent discusses modeling of a 3D face using a 2D image based on a morphable object model. A shape of a model is learned based on various accurate 3D face models obtained using the laser scanner. A 3D face may be expressed based on a Principal Component Analysis (PCA) coefficient and the PCA coefficient may be calculated by minimizing a difference between a 3D face projection and an input image. However, U.S. Pat. No. 6,556,196 uses only 2D images and thus, a reconstruction of the 3D face is unreliable. Also, the U.S. patent may use a manually marked feature point and may expend much time for calculation.

U.S. Patent Application US20090052748, titled 'Method and System for Constructing a 3D Representation of a Face from a 2D Representation' discusses that a 3D face is reconstructed using a single neutral frontal face image. Partially inputted facial features may be detected from a 2D input image. As a result, a difference between input features and composed 3D face features may be minimized.

However, U.S. Patent Application US20090052748 may have a limit in inputs. The 3D face is reconstructed from the single face image and thus, the reconstructed 3D face may be unreliable.

Although a 3D face reconstructed based on a laser scanner is very accurate, there are a variety of problems. First, the interface is not sufficiently good for the 3D face reconstruction. Second, scanning is mechanically processed and as a result much time may be expended. Third, the person being scanned may be immobile while their head is scanned. Also, some users believe that the laser is harmful to human eyes. In addition, the laser scanner is too expensive to be widely used.

A method of modeling a 3D face based on an image is unreliable compared with the modeling using the laser scanner. The method of modeling a 3D face based on an image may incur a high cost and a long calculation time. Also, the method of modeling a 3D face based on an image may not realize a reliable and accurate 3D face model. To obtain an ideal result, the method of modeling a 3D face based on an image may have a feature point manually marked. The method may use a facial 3D image and a 2D pattern PCA model. The model may be trained using a 3D face database of the laser scanner and thus, the method is complex.

SUMMARY

Additional aspects and/or advantages will be set forth in part in the description which follows and, in part, will be apparent from the description, or may be learned by practice of the disclosure.

The foregoing and/or other aspects are achieved by providing a three-dimensional (3D) face capturing apparatus, the apparatus including a color image obtaining unit to obtain a face color image, a depth image obtaining unit to obtain a face depth image, an image alignment module to align the face color image and the face depth image, a 3D face model generating module to perform two-dimensional (2D) modeling of the face color image and to perform covering of a modeled 2D face area on an image output by the image alignment module to obtain a 3D face model, a first denoising module to remove depth noise of the 3D face model, and a second denoising module to align the 3D face model and a 3D face template, and to remove residual noise based on a registration between the 3D face model and the 3D face template to obtain an accurate 3D face model.

The foregoing and/or other aspects are achieved by providing a 3D face capturing method, the method including obtaining a face color image, obtaining a face depth image, aligning, by a computer, the face color image and the face depth image, obtaining, by the computer, a 3D face model by 2D modeling of the face color image and covering a modeled 2D face area on an image output by an image alignment module, removing, by the computer, a depth noise of the 3D face model, and obtaining, by the computer, an accurate 3D face model by aligning the 3D face model and a 3D face template, and removing a residual noise based on a registration between the 3D face model and the 3D face template.

According to example embodiments, a stable 3D face may be remodeled using relatively inexpensive hardware.

According to another aspect of one or more embodiments, there is provided at least one computer readable medium including computer readable instructions that control at least one processor to implement methods of one or more embodiments.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Reference will now be made in detail to the embodiments, examples of which are illustrated in the accompanying drawings, wherein like reference numerals refer to like elements throughout. The embodiments are described below to explain the present disclosure by referring to the figures.

Figure 1:
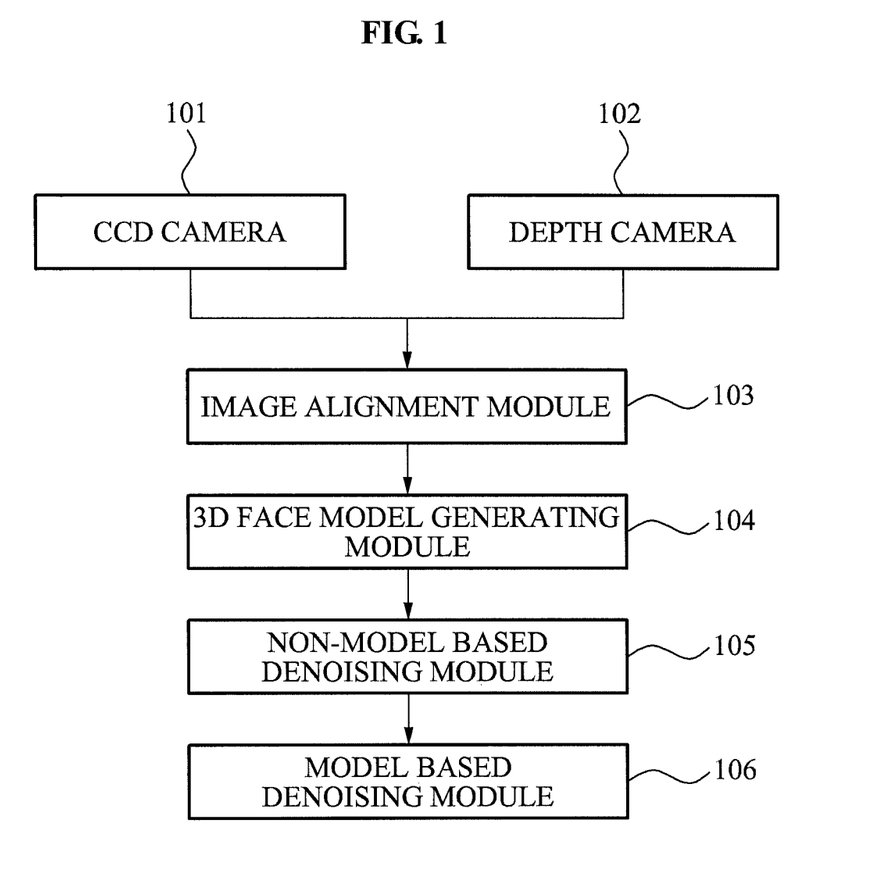
FIG. 1 is a block diagram illustrating a 3D face capturing apparatus according to example embodiments.

FIG. 1 illustrates a 3D face capturing apparatus according to example embodiments.

As illustrated in FIG. 1, the 3D face capturing apparatus may include a charge-coupled device (CCD) camera 101 as an example of a color image obtaining unit and may include a depth camera 102 and a data processor (not illustrated) as examples of a depth image obtaining unit. The data processor may include an image alignment module 103, a 3D face mode generating module 104, a non-model based denoising module 105, and a model based denoising module 106.

The CCD camera 101 may obtain a face color image, namely, a face RGB image, for example, a color image of 1024 pixels*768 pixels.

The depth camera 102 may be a time-of-flight (TOF) camera and may obtain an intensity image and a depth image.

The CCD camera may obtain the face RGB image, and the depth camera may obtain the intensity image and the depth image. The RGB image and the depth image may be obtained through two different cameras and thus, the RGB image and the depth image may not be directly merged. A single image alignment module is provided in the example embodiments.

The image alignment module may align images of the two different cameras to output an image having six elements including R, G, B, x, y, and z. Specifically, the output image may have color information and the depth information.

A demarcation may be determined by a camera, and an internal parameter of the camera and an external parameter of the camera may be calculated.

Subsequently, the image based on the six elements, namely, R, G, B, x, y, and z, may be output to the 3D face generating module.

The 3D face model generating module may generate an approximate 3D face model based on the output image based on the six elements. A procedure is described below.

First, a face area is detected from the RGB image and two eyes are detected from the face area.

The face area and the eyes may be accurately detected using a conventional Haar detection.

Second, the face area is separated from the RGB image.

Figure 2:
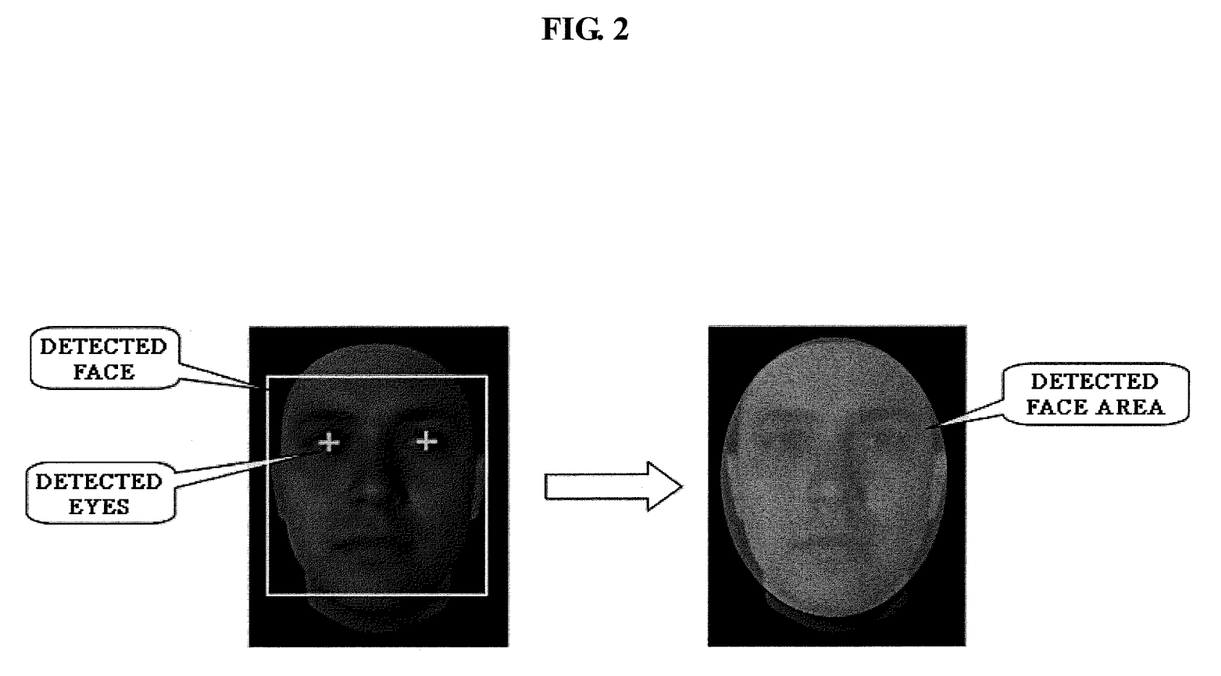
FIG. 2 is a diagram illustrating a face part separated from an RGB image according to example embodiments.

FIG. 2 is a diagram illustrating a face part separated from an RGB image according to example embodiments.

According to a method of the separation of FIG. 2, a 2D ellipse modeling may be used, and an ellipse parameter may be calculated based on coordinates of two eyes, namely, $(x_0, y_0)$ and $(x_1, y_1)$. A rotation of a face area may be adjusted to be $y_0=y_1$.

A separated face area forms an ellipse.

$$\frac{(x-\bar{x})^2}{a^2} + \frac{(y-\bar{y})^2}{b^2} = 1 \qquad \text{[Equation 1]}$$

A center of the ellipse is $(\bar{x}, \bar{y})$.

$$\bar{x}=(x_0+x_1)/2$$

$$\bar{y}=y_0-a_0 \times D \qquad \text{[Equation 2]}$$

In Equation 2, D denotes a distance between the two eyes and $a_0$, denotes an invariable parameter.

$$D=\sqrt{(x_0+x_1)^2+(y_0+y_1)^2}=|x_0-x_1| \qquad \text{[Equation 3]}$$

A long axis and a short axis are respectively determined in Equation 3 as discussed below.

$$a=D \times a_1$$

$$b=D \times a_2 \qquad \text{[Equation 4]}$$

In Equation 4, $a_1$ and $a_2$ are two invariable values. $a_0$, $a_1$ and $a_2$ may be calculated based on 2D face image modeling.

Subsequently, the separated face area may be obtained. Although a 3D face model may be obtained by covering the obtained ellipse face area on an image of six elements, the generated 3D face model may include a great amount of noise. Therefore, denoising with respect to the generated 3D face model may be performed.

The denoising may be completed based on a model-based denoising module and non-model based denoising module.

Noise in a direction of x and noise in a direction of y may be reduced in the separated face area that is separated using the ellipse model. The non-model based denoising module may remove noise in a direction of z, namely, depth noise.

Figure 3:
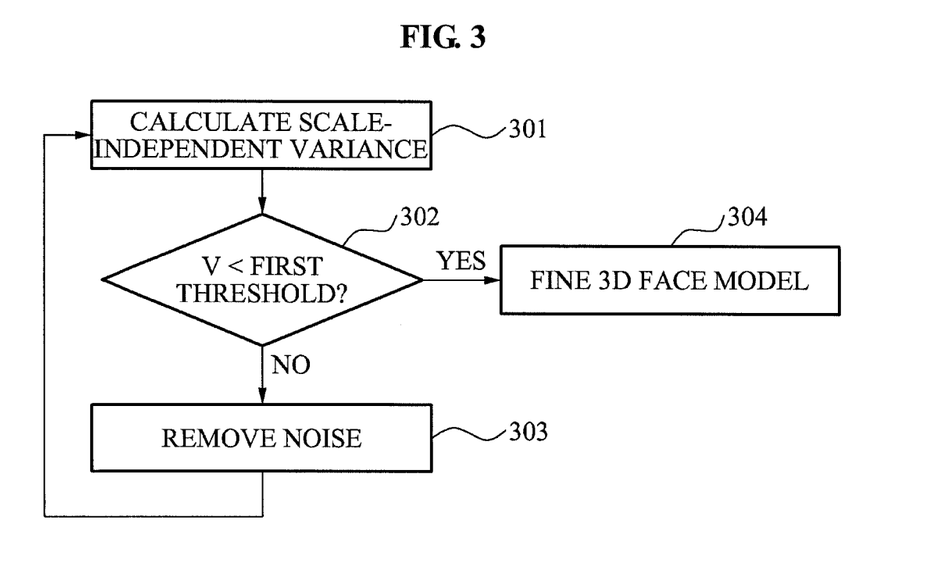
FIG. 3 is a flowchart illustrating a depth noise removing method using substitution according to example embodiments.
Figure 4:
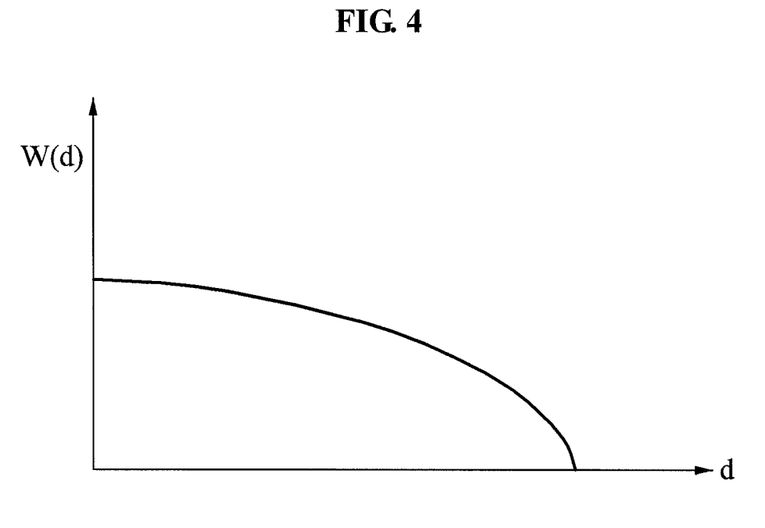
FIG. 4 is a illustrates a weight function when a scale-independent variance is performed according to example embodiments.

FIG. 3 illustrates a depth noise removing method using a substitution according to embodiments, and FIG. 4 illustrates a weight function when a scale-independent variance is performed according to example embodiments.

The depth noise may be removed based on the substitution of FIG. 3.

A key point of the substitution may be calculating a scale-independent variance (V) in a direction of z. When all sample points are multiplexed by the same ratio factor, V may remain as an invariable variance throughout the example embodiments.

In operation 301, V is calculated with respect to a 3D face model of a 3D face model generating module. V may be calculated as given in Equation 5.

$$V = \frac{\bar{V}}{V'} \qquad \text{[Equation 5]}$$

$$V' = \sum (X_i - \bar{X})^T (X_i - \bar{X})$$

$$\bar{V} = \frac{\sum W(|X_i - \bar{X}|) \times (X_i - \bar{X})^T (X_i - \bar{X})}{\sum W(|X_i - \bar{X}|)}$$

In Equation 5, W(d) denotes a weight function of FIG. 4. Weight may decrease as a difference value (d) is larger, and the weight may decrease to zero when d reaches a predetermined threshold. The weight function may be selected based on the described feature. $X_i$ denotes an $i^{th}$ vertex of the generated 3D face model, and includes information associated with X axis, Y axis, and Z axis. $\bar{X}$ denotes an average value of vertices.

In operation 302, it is determined whether V is greater than a first threshold. The first threshold may be selected based on experimentation. V with respect to a 3D face model having a small amount of noise, for example, a 3D face template, may be calculated, and the calculated V may be increased based on a ratio parameter. For example, the ratio parameter may be 1.2 which may be used as the first threshold. V may be adjusted to be small through several experiments and thus, an appropriate first threshold may be obtained.

When V is less than the first threshold, noise does not exist in the 3D face model. Therefore, the non-model based denoising may be performed.

When V is greater than or equal to the first threshold, noise still exists in the 3D face model. Therefore, the noise is removed in operation 303. A 3D point that is relatively far from a center of the 3D face model may be regarded as noise and may be removed. Operations 301 through 303 may be iteratively performed after removing the noise in operation 303 until V is less than the first threshold and a fine 3D face model is produced in operation 304.

It may be determined whether the 3D point is relatively far from the center of the 3D face model based on the process below.

First, an average value of vertices ($\bar{z}$) in a direction of z may be calculated, namely depth direction average value of vertices. Specifically, an average value of a depth information direction may be calculated to remove depth noise.

$$\bar{z}_{m+1} = \frac{\sum W(z_i - \bar{z}_m) \times z_i}{\sum w(z_i - \bar{z}_m)} \quad \text{[Equation 6]}$$

According to example embodiments, $\bar{z}$ may be calculated based on substitution.

W of $W(z_i - \bar{z}_m)$ may be a weight function, and may be slected as described in FIG. 4. $z_i$ is a depth coordinate of an $i^{th}$ vertex. m is a subscript of $\bar{z}_m$. A parameter convergence may be represented, and the substitution may be stopped when a difference between $\bar{z}_{m+1}$ and $\bar{z}_m$ is sufficiently small, for example, when a difference is 0.0001, after an $M^{th}$ substitution is performed.

Subsequently, a second threshold (T) may be compared with a difference between a depth of the vertex and $\bar{z}$. Specifically, it may be determined whether $|z_i - \bar{z}| > T$ is satisfied. When the difference is greater than T, the distance of the vertex may be regarded as being relatively far from the center of the 3D face model. Specifically, the vertex may be regarded as noise and may be removed. Conversely, when the difference is less than or equal to T, the vertex may not be noise and thus, the vertex may remain.

T may be calculated as follows.

$$T = const \times \sqrt{\frac{\sum W(z_i - \bar{z}) \times (z_i - \bar{z})^2}{\sum W(z_i - \bar{z})}} \quad \text{[Equation 7]}$$

In Equation 7, const denotes a constant, for example, 3, and $\bar{z}$ is a result of convergence of $$\bar{z}_{m+1} = \frac{\sum W(z_i - \bar{z}_m) \times z_i}{\sum w(z_i - \bar{z}_m)}.$$

The noise in a depth direction may be removed based on the above described process.

After passing through the 3D face model generating module and the non-model based denoising module, most of nodes may be removed. As a result, the 3D face model having a small amount of noise may be obtained.

A face in the 3D face model and a face in the 3D template are highly similar to each other. The 3D face model and the 3D face template may be aligned, and may remove noise based on a registration between the 3D face model and the 3D face template. Specifically, the 3D face model and the 3D face template may be aligned and the noise may be removed during the model-based denoising.

Figure 5:
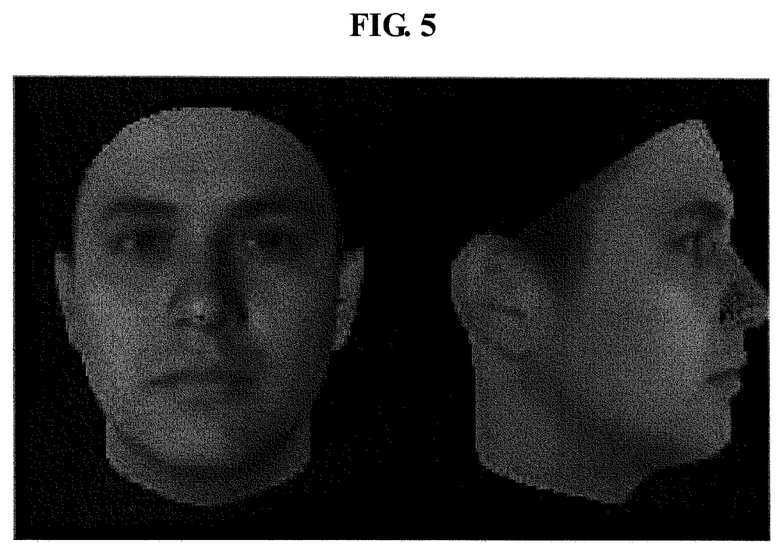
FIG. 5 is a diagram illustrating an example of a 3D face template used in example embodiments.

FIG. 5 illustrates an example of a 3D face template used in example embodiments.

A scale of 3D face template and a scale of a 3D face model may be different from each other. However, a conventional alignment calculation, namely, an iterative closest point (ICP) calculation, may demand that a scale of an input model and a scale of a reference model be the same. Also, the conventional ICP calculation may not align the 3D face model and the 3D face template. Therefore, a new alignment calculation, namely, a multi-feature ICP may be provided.

Figure 6:
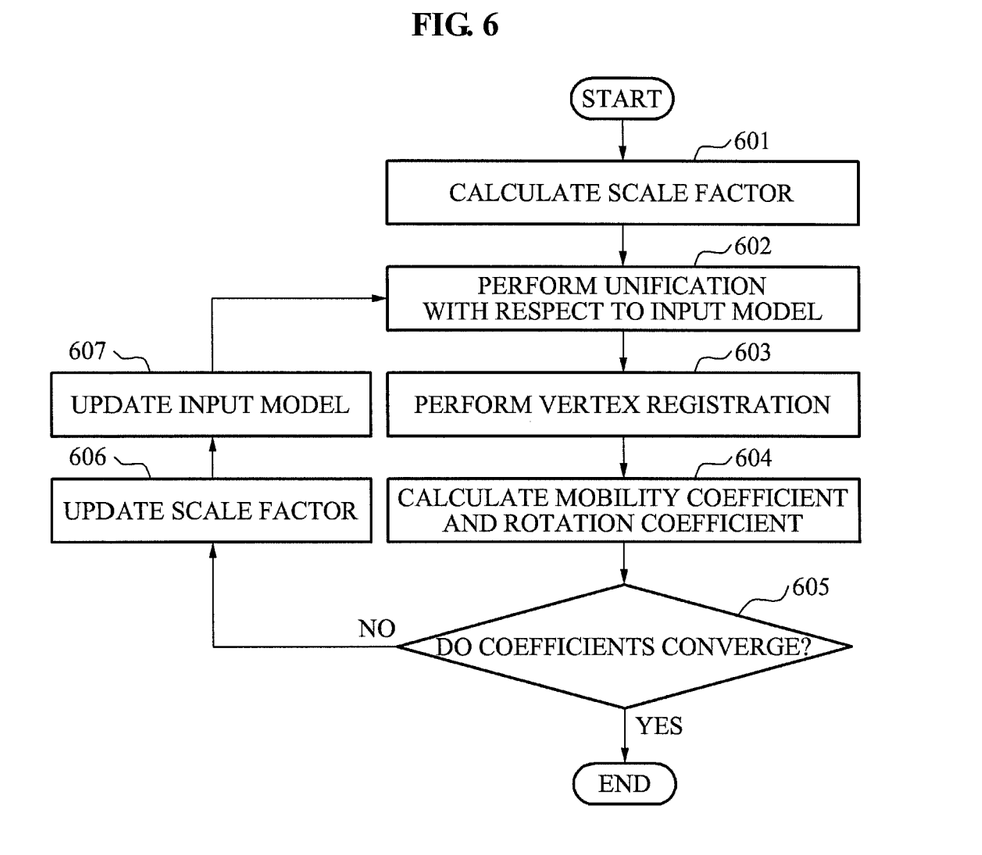
FIG. 6 is a flowchart illustrating a multi-feature Iterative Closest Point (ICP) according to example embodiments.

FIG. 6 illustrates a multi-feature Iterative Closest Point (ICP) calculation according to example embodiments.

According to the multi-feature ICP calculation, a scale factor is calculated with respect to an input 3D face model in operation 601 based on Equation 8.

$$s = \sqrt{\frac{\sum(X_i - \bar{X}) \times (X_i - \bar{X})^T}{\sum(X_i' - \bar{X}') \times (X_i' - \bar{X}')^T}} \quad \text{[Equation 8]}$$

In Equation 8, $X_i$ denotes an $i^{th}$ vertex of the 3D face model, and $\bar{X}$ denotes an average value of vertices of the 3D face model.

Here, $X_i$" denotes an $i^{th}$ vertex of a 3D face template, and $\bar{X}'$ denotes an average value of vertices of the 3D face template.

Unlike the conventional ICP, the inputted 3D face model may include coordinates of a vertex and color information. A normal direction of the vertex and information associated with an area adjacent to the vertex may also be calculated.

In operation 602, unification with respect to the input 3D face template is performed based on the calculated scale factor.

In operation 603, vertex registration with respect to the 3D face model and the 3D face template is performed, and points remaining after the registration between the 3D face model and the 3D face template, namely, noise points, are removed. To calculate a robust vertex correspondence between the 3D face model and the 3D face template during the multi-feature ICP, the multi-feature may be selected to perform a point registration, and a correspondence point may be detected. The multi-feature may include 3D coordinates of the vertex, color information, a normal direction, information associated with an area adjacent to the vertex. A location of an accurate correspondence may be promptly and stably determined based on the above information. Therefore, the vertex registration of the multi-feature ICP may be more accurately performed.

In operation 604, a mobility coefficient and a rotation coefficient with respect to the vertex of the vertex registration are calculated.

In operation 605, it is determined whether the mobility coefficient and the rotation coefficient converge. When the mobility coefficient and the rotation coefficient converge, it may indicate that the registration between the 3D face model and the 3D face template has already been performed. Conversely, when the mobility coefficient and the rotation coefficient do not converge, the scale factor may be updated in operation 606. Specifically, the scale factor may be calculated again based on Equation 9.

$$s = \sqrt{\frac{\sum (X_i - \overline{X}) \times (X_i - \overline{X})^T}{\sum (X_i' - \overline{X}') \times (X_i' - \overline{X}')^T}}$$ [Equation 9]

In Equation 9, $X_i$ denotes an $i^{th}$ vertex of the 3D face model, and $\overline{X}$ denotes an average value of vertices of the 3D face model. $X_i'$ denotes an $i^{th}$ vertex of the 3D face template, and $\overline{X}'$ denotes an average value of vertices of the 3D face template.

In operation 607, the input 3D face model may be updated based on the updated scale factor. Operation 602 through operation 605 may be iteratively performed until the mobility coefficient and the rotation coefficient converge. Specifically, an alignment between the 3D face model and the 3D face template may be completed.

The multi-feature ICP may calculate a scale factor between two models and iteratively perform aligning of the two models.

Although the two models have different scales, the multi-feature ICP may reliably align the 3D face model and the 3D face template.

According to example embodiments, a fine 3D face model may be obtained by a process of a 3D face capturing apparatus.

Figure 7:
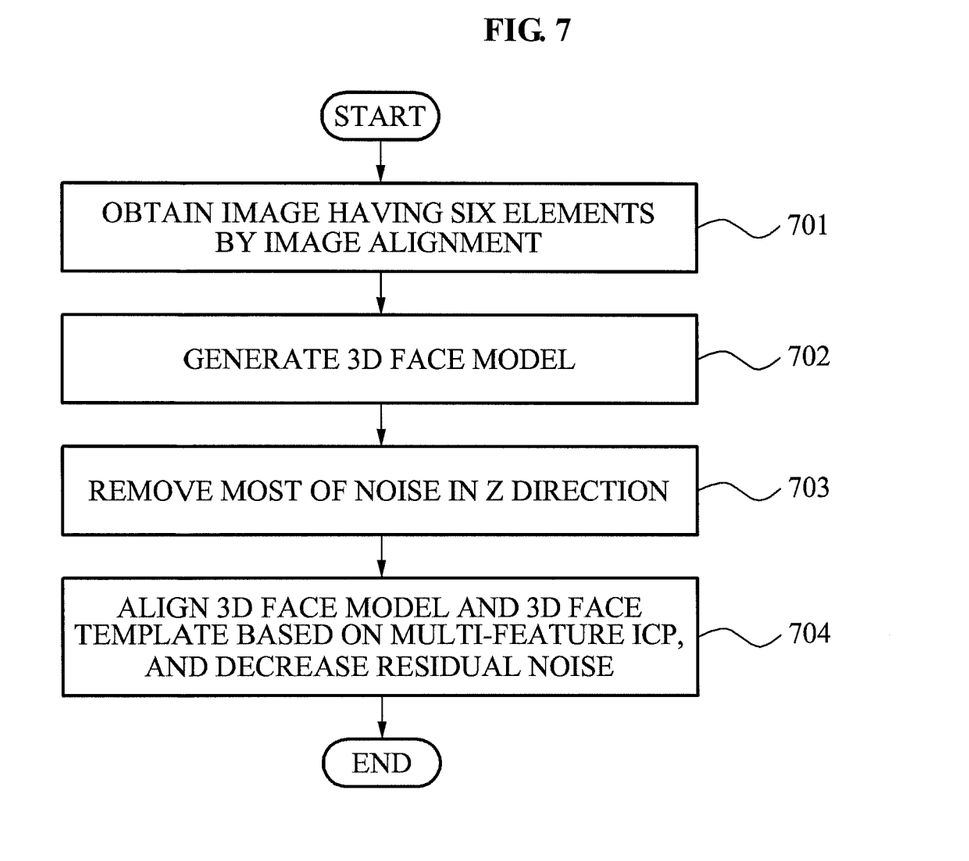
FIG. 7 is a flowchart illustrating a 3D face capturing method according to example embodiments.

FIG. 7 illustrates a 3D face capturing method according to example embodiments.

A color image and a depth image are captured using a CCD camera and a depth camera. An image having six elements, namely, R, G, B, x, y, and z, is obtained through an image alignment in operation 701.

In operation 702, a 3D face model is generated and most noise on an xy-plane is removed.

In operation 703, most noise in a depth direction, namely, most noise in a z direction, is removed.

In operation 704, the 3D face model and the 3D face template are aligned based on a multi-feature ICP calculation, and residual noise points decrease.

The multi-feature ICP has been described above and thus, detailed descriptions thereof will be omitted.

After processing four processes, an accurate 3D face model may be obtained.

The 3D face capturing method is only an example, and the 3D face capturing method may be applicable to various 3D image capturing methods. Furthermore, the method may be applicable to 3D images of all animal images or to 3D images of transportation, such as an aircraft, a vehicle, and the like. A time to remodel the 3D image may be decreased, and the remodeled 3D image may be more reliable. A 3D face capturing apparatus may be inexpensive and may be easily embodied.

The above-described embodiments may be recorded in non-transitory computer-readable media including program instructions to implement various operations embodied by a computer. The media may also include, alone or in combination with the program instructions, data files, data structures, and the like. Examples of computer-readable media (computer-readable storage devices) include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may be a plurality of computer-readable storage devices in a distributed network, so that the program instructions are stored in the plurality of computer-readable storage devices and executed in a distributed fashion. The program instructions may be executed by one or more processors or processing devices. The computer-readable media may also be embodied in at least one application specific integrated circuit (ASIC) or Field Programmable Gate Array (FPGA). Examples of program instructions include both machine code, such as produced by a compiler, and files containing higher level code that may be executed by the computer using an interpreter. The described hardware devices may be configured to act as one or more software modules in order to perform the operations of the above-described exemplary embodiments, or vice versa.

Although a few embodiments have been shown and described, it should be appreciated by those skilled in the art that changes may be made in these embodiments without departing from the principles and spirit of the disclosure, the scope of which is defined in the claims and their equivalents.

What is claimed is:

1. An apparatus capturing a three-dimensional (3D) face, the apparatus comprising:
    a color image obtaining unit to obtain a face color image;
    a depth image obtaining unit to obtain a face depth image;
    an image alignment module to align the obtained face color image and the obtained face depth image;
    a 3D face model generating module to perform two-dimensional (2D) modeling of the obtained face color image, and to perform covering of a modeled 2D face area on an image output by the image alignment module to obtain a 3D face model;
    a first denoising module to remove depth noise of the 3D face model; and
    a second denoising module to align the 3D face model and a 3D face template, and to remove residual noise based on a registration between the 3D face model and the 3D face template to obtain an accurate 3D face model,
    wherein the 3D face model generating module performs the 2D modeling using an ellipse face color image, and
    wherein the first denoising module calculates a scale-independent variance (V) in a depth direction, and compares V with a first threshold to determine whether noise exists in the 3D face model.

2. The apparatus of claim 1, wherein a method of calculating V satisfies Equation 10:

$$V = \frac{\overline{V}}{V'} \qquad \text{Equation 10}$$

$$V' = \sum (X_i - \overline{X})^T (X_i - \overline{X})$$

$$\overline{V} = \frac{\sum W(|X_i - \overline{X}|) \times (X_i - \overline{X})^T (X_i - \overline{X})}{\sum W(|X_i - \overline{X}|)},$$

wherein W denotes a weight function, $X_i$ denotes an $i^{th}$ vertex of the 3D face model, and $\overline{X}$ denotes an average value of vertices of the 3D face model.

3. The apparatus of claim 1, wherein the first threshold is selected based on experimentation.

4. The apparatus of claim 1, wherein, when the determining determines that the noise exists in the 3D face model, the first denoising module calculates a depth direction average value of vertices ($\overline{z}$), compares a second threshold (T) with a difference between a depth of a vertex and $\bar{z}$, and removes the vertex as the noise when the difference is greater than T.

5. The apparatus of claim 4, wherein $\bar{z}$ is calculated by substitution based on Equation 11:

$$\bar{z}_{m+1} = \frac{\sum W(z_i - \bar{z}_m) \times z_i}{\sum w(z_i - \bar{z}_m)}. \quad \text{Equation 11}$$

wherein W denotes a weight function, $z_i$ denotes a depth coordinate of an $i^{th}$ vertex, $\bar{z}_{m+1}$ stops convergence and substitution when a difference between $\bar{z}_{m+1}$ and $\bar{z}_m$ is 0.0001 after an $m^{th}$ substitution is performed, m being a subscript of $\bar{z}_m$, and a result of the convergence is $\bar{z}$.

6. The apparatus of claim 4, wherein T satisfies Equation 12:

$$T = const \times \sqrt{\frac{\sum W(z_i - \bar{z}) \times (z_i - \bar{z})^2}{\sum W(z_i - \bar{z})}}, \quad \text{Equation 12}$$

wherein const is a constant.

7. The apparatus of claim 1, wherein the second denoising module performs:
 calculating a length factor,
 unification with respect to the input 3D face template based on the calculated length factor;
 a vertex registration with respect to the 3D face model and the 3D face template based on features;
 calculating a mobility coefficient and a rotation coefficient with respect to a vertex of the vertex registration;
 determining whether the mobility coefficient and the rotation coefficient converge;
 updating the length factor when the mobility coefficient and the rotation coefficient do not converge;
 updating the 3D face model based on the updated length factor; and
 repeating the calculating the length factor, unification, vertex registration, calculating the mobility and the rotation coefficient, determining, updating the length factor and updating the 3D face model until the mobility coefficient and the rotation coefficient converge.

8. The apparatus of claim 7, wherein the features include 3D coordinates of a vertex, color information, a normal direction, and information associated with an area adjacent to the vertex.

9. The apparatus of claim 1, wherein the color image obtaining module is a CCD camera.

10. The apparatus of claim 1, wherein the depth image obtaining module is a depth camera.

11. A method of capturing a 3D face, the method comprising:
 obtaining a face color image;
 obtaining a face depth image;
 aligning, by a computer, the obtained face color image and the obtained face depth image;
 obtaining, by the computer, a 3D face model by 2D modeling of the obtained face color image and covering a modeled 2D face area on an image output by an image alignment module;
 removing, by the computer, depth noise of the 3D face model;
 and obtaining, by the computer, an accurate 3D face model by aligning the 3D face model and a 3D face template, and removing residual noise based on a registration between the 3D face model and the 3D face template,
 wherein the 2D modeling performs the 2D modeling with respect to the face color image using an ellipse, and
 wherein a scale-independent variance (V) is calculated in a depth direction, and compares V with a first threshold to determine whether noise exists in the 3D face model.

12. The method of claim 11, wherein a method of calculating V satisfies Equation 13:

$$V = \frac{\bar{V}}{V'} \quad \text{Equation 13}$$
$$V' = \sum (X_i - \bar{X})^T (X_i - \bar{X})$$
$$\bar{V} = \frac{\sum W(|X_i - \bar{X}|) \times (X_i - \bar{X})^T (X_i - \bar{X})}{\sum W(|X_i - \bar{X}|)},$$

wherein W denotes a weight function, $X_i$, denotes an $i^{th}$ vertex of the 3D face model, and $\bar{X}$ denotes an average value of vertices of the 3D face model.

13. The method of claim 11, wherein the first threshold is selected based on experimentation.

14. The method of claim 11, wherein the removing comprises:
 calculating a depth direction average value of vertices ($\bar{z}$) when the noise exists in the 3D face model;
 comparing a second threshold (T) with a difference between a depth of a vertex and $\bar{z}$; and
 removing the vertex as the noise when the difference is greater than T.

15. The method of claim 14, wherein the $\bar{z}$ is calculated by substitution based on Equation 14:

$$\bar{z}_{m+1} = \frac{\sum W(z_i - \bar{z}_m) \times z_i}{\sum w(z_i - \bar{z}_m)}, \quad \text{Equation 14}$$

wherein W denotes a weight function, $z_i$ denotes a depth coordinate of an $i^{th}$ vertex, $\bar{z}_{m+1}$ stops convergence and substitution when a difference between $\bar{z}_{m+1}$ and $\bar{z}_m$ is 0.0001 after an $m^{th}$ substitution is performed, m being a subscript of $\bar{z}_m$, and a result of the convergence is $\bar{z}$.

16. The method of claim 14, wherein T satisfies Equation 15:

$$T = const \times \sqrt{\frac{\sum W(z_i - \bar{z}) \times (z_i - \bar{z})^2}{\sum W(z_i - \bar{z})}}, \quad \text{Equation 15}$$

wherein const is a constant.

17. The method of claim 11, wherein the aligning comprises:
 calculating a length factor;
 performing unification with respect to the input 3D face template based on the calculated length factor;
 performing a vertex registration with respect to the 3D face model and the 3D face template based on features;
 determining whether a mobility coefficient and a rotation coefficient converge by calculating the mobility coefficient and the rotation coefficient with respect to a vertex of the vertex registration;
 updating the length factor when the mobility coefficient and the rotation coefficient do not converge;

updating the 3D face model based on the updated length factor; and repeating the calculating the length factor, unification, vertex registration, calculating the mobility and the rotation coefficient, determining, updating the length factor and updating the 3D face model until the mobility coefficient and the rotation coefficient converge.

18. The method of claim 17, wherein the features include 3D coordinates of a vertex, color information, a normal direction, and information associated with an area adjacent to the vertex.

19. The method of claim 17, wherein, when a vertex that is not registered exists in the 3D face model, the performing of the vertex registration comprises removing the vertex as noise.

20. At least one non-transitory computer readable recording medium comprising computer readable instructions that control at least one processor to implement a method, comprising:

obtaining a face color image;

obtaining a face depth image;

aligning the obtained face color image and the obtained face depth image;

obtaining a 3D face model by 2D modeling of the obtained face color image and covering a modeled 2D face area on an image output by an image alignment module;

removing depth noise of the 3D face model; and obtaining an accurate 3D face model by aligning the 3D face model and a 3D face template, and removing residual noise based on a registration between the 3D face model and the 3D face template, wherein the 2D modeling is performed using an ellipse face color image, and wherein a scale-independent variance (V) is calculated in a depth direction, and compares V with a first threshold to determine whether noise exists in the 3D face model.

* * * * *

UNITED STATES PATENT AND TRADEMARK OFFICE
CERTIFICATE OF CORRECTION

PATENT NO. : 8,803,950 B2
APPLICATION NO. : 12/862293
DATED : August 12, 2014
INVENTOR(S) : Haibing Ren et al.

Page 1 of 1

It is certified that error appears in the above-identified patent and that said Letters Patent is hereby corrected as shown below:

In the Claims
Column 9, Line 6-7 (Equation), In Claim 5, delete $$\bar{z}_{m+1} = \frac{\sum W(z_i - \ddot{z}_m) \times z_i}{\sum w(z_i - \ddot{z}_m)}$$

","

and insert --

$$\bar{z}_{m+1} = \frac{\sum W(z_i - \bar{z}_m) \times z_i}{\sum w(z_i - \bar{z}_m)}$$

--, therefor.

Signed and Sealed this
Fifth Day of May, 2015

Michelle K. Lee
*Director of the United States Patent and Trademark Office*